Feb. 22, 1949.   E. E. WALLACE   2,462,574
JOINT FOR SHAFTS
Filed Sept. 28, 1942   2 Sheets-Sheet 1
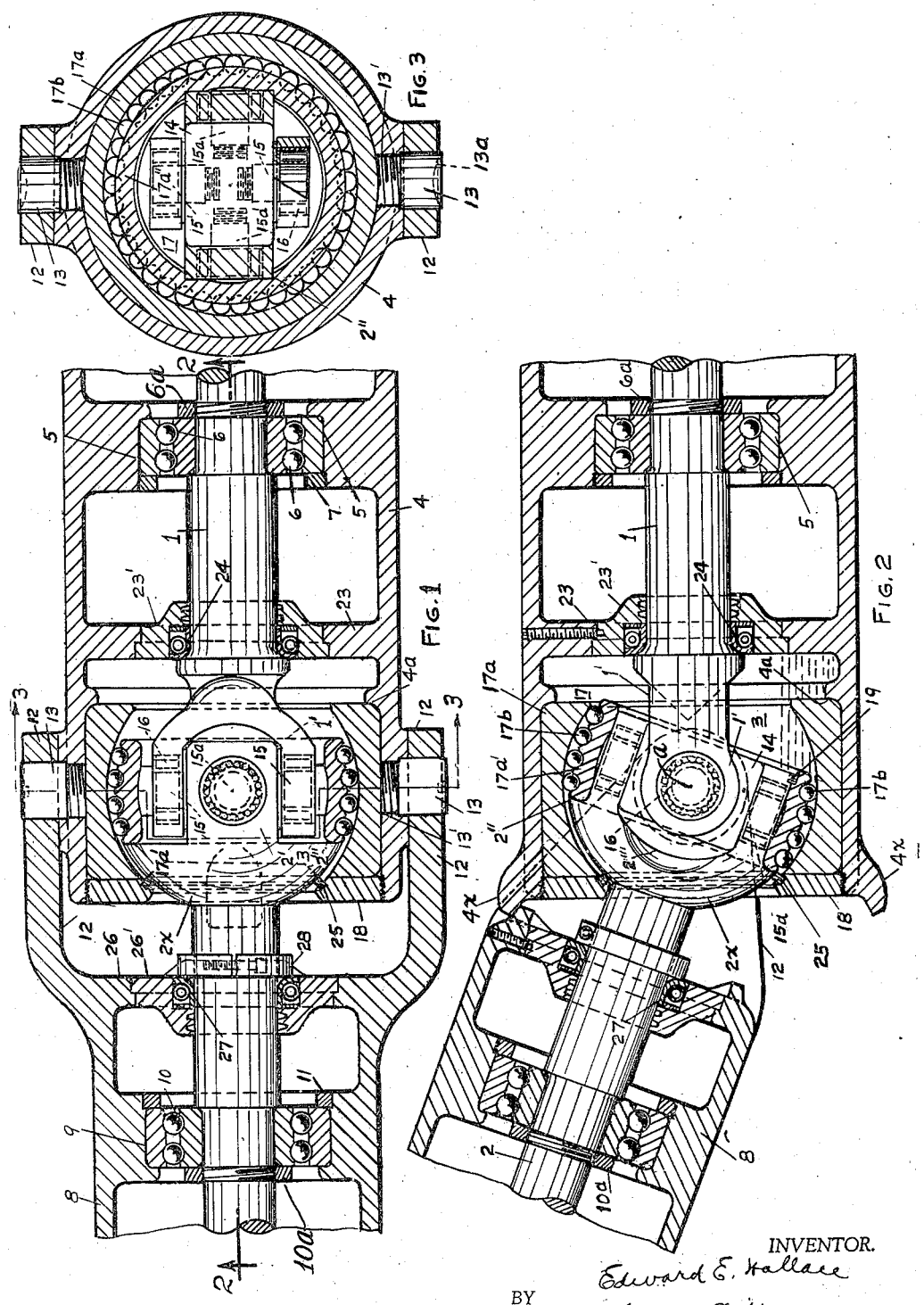
INVENTOR.
Edward E. Wallace
BY Geo. B. Pitts
attorney

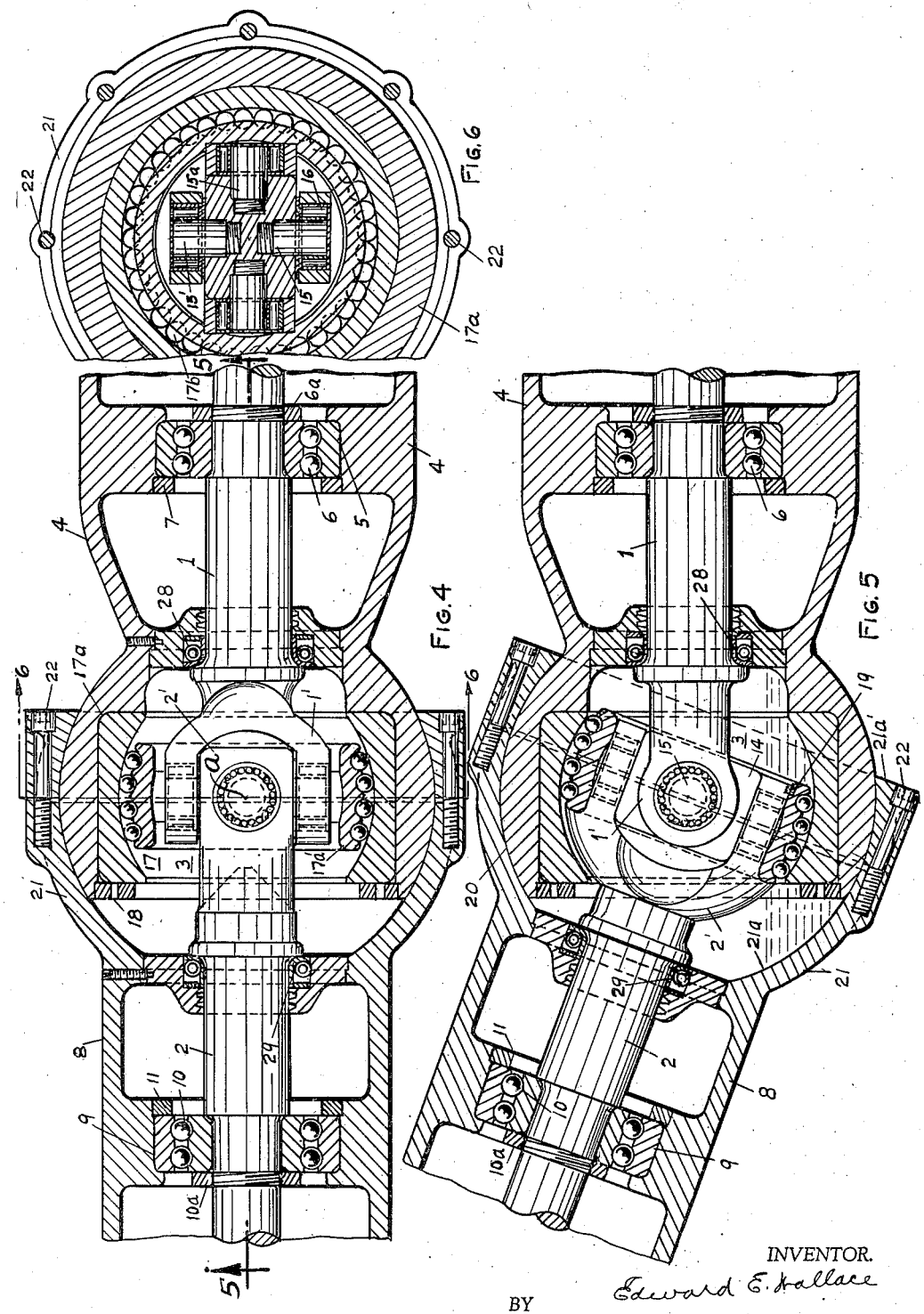

Patented Feb. 22, 1949

2,462,574

UNITED STATES PATENT OFFICE 2,462,574

JOINT FOR SHAFTS

Edward E. Wallace, Cleveland Heights, Ohio;
Daisy T. Wallace administratrix of said Edward
E. Wallace, deceased Application September 28, 1942, Serial No. 459,943

7 Claims. (Cl. 64—4)

This invention relates to a sectional shaft, more particularly to the joint between the sections of a shaft, whereby the power applied to one section may be transmitted to the other section irrespective of the angular relation of these sections.

One object of the invention is to provide an improved sectional shaft, one section of which may be in a fixed angular relation to an adjacent section or adjustable relative thereto.

Another object of the invention is to provide an improved sectional shaft having a simplified connection between them permitting one section to be angularly related to the adjacent section.

Another object of the invention is to provide an improved sectional shaft having a connection between them constructed to relieve stresses on the shaft sections or the bearings therefor, whereby loss of power is reduced and vibrations of the sections are eliminated.

Another object of the invention is to provide an improved joint for the sections of a shaft having housings wherein the joint may operate in a sealed chamber adapted to hold a lubricant.

Another object of the invention is to provide an improved sectional shaft having housings for the shaft sections wherein the housings and shaft sections are provided with jointed connections, respectively, permitting angular movement thereof about a common axis.

Another object of the invention is to provide an improved connection or joint between the sections of a shaft wherein the torque of the driving section is transmitted to the driven section through the axis of the joint, whereby lateral stresses on or vibrations of either section and undue wear on the bearings therefor are eliminated.

Another object of the invention is to provide an improved connection or joint for the sections of a shaft wherein the elements of the connection or joint float in anti-friction bearings, whereby each shaft section is maintained against deflection.

A further object of the invention is to provide an improved universal joint for the sections of a shaft of simplified construction.

Other objects of the invention will be apparent to those skilled in the art to which my invention relates from the following description taken in connection with the accompanying drawings, wherein Fig. 1 is a fragmentary section showing the assembly embodying my invention.

Fig. 2 is a section on the line 2—2 of Fig. 1, one shaft section being shown disposed at an angle to the other section.

Fig. 3 is a section on the line 3—3 of Fig. 1.

Fig. 4 is a view, partly in plan and partly in section, showing a modified form of construction, wherein the connection between the shaft sections is of the universal type.

Fig. 5 is a section on the line 5—5 of Fig. 4 (the shafts sections and connections therebetween being in full lines), but showing one shaft section at an angle to the other section.

Fig. 6 is a section on the line 6—6 of Fig. 4.

Referring to Figs. 1, 2 and 3, 1, 2, indicate the sections of a sectional shaft, either one of which may be the driving section to transmit torque through a connection or joint, indicated as an entirety at 3, to the other section. The inner ends of the shaft sections terminate in forked members 1', 2', respectively, the forked members 1' being disposed at right angles to the forked members 2' and forming elements of the connection or joint 3, as later set forth. 4 indicates a suitable housing through which the shaft section 1 extends, the housing being provided interiorly with a shouldered wall 5 to form a seat for the outer race of suitable anti-friction bearings 6 for supporting the shaft section 1 outwardly of the joint 3, the outer race of the bearings 6 being secured in its seat by a ring nut 7 having threaded engagement with the wall 5, whereas the inner race of the bearings 6 is held against an annular shoulder on the shaft section 1 by a ring nut 6a. 8 indicates a suitable housing through which the shaft section 2 extends, the housing being provided interiorly with a shouldered wall 9 to form a seat for the outer race of suitable anti-friction bearings 10 for supporting the shaft section 2 outwardly of the joint 3, the outer race of the bearings 10 being secured in its seat by a ring nut 11 having threaded engagement with the wall 9, whereas the inner race of the bearings 10 is held against an annular shoulder on the shaft section 2 by a ring nut 10a. The housing 8 terminates at its inner end in spaced arms 12 the outer ends of which pivotally engage trunnions 13 provided in diametrical relation exteriorly of the side walls of the housing 4, the axes of the trunions 13 being coincidentally related to the axis of the connection 3, whereby either shaft section and its housing may be disposed at an angle to the other shaft section and its housing, as will be apparent from Fig. 2.

By preference, each trunnion 13 is provided on its inner end with screw threads engaging a threaded opening 13' formed in the wall of the housing 4. As shown in dotted lines, each trunnion 13 is provided on its outer end with a kerf 13a, whereby it may be positioned and removed.

Of the connection or joint 3, 14 indicates a block, preferably of rectangular shape and provided on its lateral walls with suitable stud shafts 15, 15', 15a, 15a', the axes of the stud shafts on opposite side walls of the block 14 being axially related. The forked members 1' are pivotally mounted on the stud shafts 15, 15', and the forked members 2' are pivotally mounted on the stud shafts 15a, 15a'. As will be noted in Figs. 1 and 2, the axis on which the forked members 1' pivot intersects the axis on which the forked members 2' pivot, this point of intersection forming an axis a, that is coincidently related to the longitudinal axes of the shaft sections and about which each section and its housing are movable relative to the other section and its housing, as already set forth. 16 indicates suitable anti-friction bearings between each stud shaft and the adjacent forked member.

By preference, each stud shaft 15, 15', 15a, 15a', is provided on its inner end with screw threads engaging a threaded opening formed in the adjacent side wall of the block 14 (see Fig. 3).

17 indicates an anti-friction bearing incorporated in the connection or joint 3 for supporting the forked members of the shaft sections 1, 2, when in alined or in any angular relationship. The bearing 17 comprises outer and inner annular races 17a, 17a', fixedly related to the shaft sections, 1, 2, respectively, and a plurality of anti-friction elements (preferably balls) 17b between them. As shown, the opposed faces of the races 17a, 17a', in cross section, are spherically related to the axis a of the connection or joint 3, whereby the forked members 1', 2', are rotatably mounted and free to swing or be adjusted into angular relation about this axis. In this arrangement, a single anti-friction bearing supports the inner or connected ends of the shaft sections 1, 2, and cooperates with the bearings 6 and 10 so that three bearings only, that is, bearings 6, 17 and 10, are required to support both shaft sections. It will be observed that since the bearing 17 is concentric to the axis a of the connection or joint 3 in planes at right angles to and cutting the longitudinal axes of the shaft sections 1, 2, when said sections are in axial relation, it provides for rotation of the forked members 1', 2', about this axis, whether the shaft sections 1, 2, are axially related or disposed one at any angle to the other. As a result, no vibrations are set up in the shaft sections, that is, lateral vibrations at their inner or connected ends and vibrations endwise of the sections, so that undue wear on the bearings 6, 10, is eliminated, frictional losses are materially reduced and efficiency and durability increased.

In the form of construction shown, the outer bearing race 17a is mounted in the housing 4 adjacent its inner end, being seated against an annular shoulder 4a and rigidly secured in position by a ring nut 18 having threaded engagement with the inner wall of the housing (but if desired the race 17a may also be locked to the wall of the housing by a suitable set screw or key), whereas the inner race 17a' is mounted on the forked member 2', the forked member 2' and the inner wall of the race being milled out to form seats 2'' for the forked member 2', whereby the race is carried by the latter. A set screw 19 may be employed to secure the race in its seat. The forked member 2'' is relieved, as shown at 2''' to provide clearance for the forked member 1'.

As will be understood from the drawings, the outer race 17a has a width to accommodate the inner race 17a' throughout the range of relative angular movement or adjustment of the housings 4 and 8 about the trunnions 13, as limited by the engagement of the housing 8 with suitable stops 4x on the walls of the housing 4.

Figs. 4, 5 and 6 illustrate a modification wherein provision is made between the housings to permit universal angular movement of the shaft sections 1, 2. In this form of construction the mounting of and connections between the shaft sections 1, 2, are similar to corresponding parts shown in Figs. 1, 2 and 3, but the housings 4 and 8 are connected by ball-and-socket members to provide a sealed closure for the joint 3 at the inner ends of the housings 4, 8, one to swing or move in any direction relative to the other. In the arrangement shown, the outer wall of the housing 4 adjacent its free end is in cross section, concentric to the axis of the connection or joint 3, in planes at right angles to and longitudinally of the housing 4, as shown at 20, which wall 20 forms part of a sphere, whereas the free end of the housing 8 is provided with a socket 21 the inner wall of which is, in cross section, concentric to the axis of the connection or joint 3, and complementary related to the wall 20 of the housing 4 for rotatable and slidable movement thereon. The socket 21 is formed of two sections 21a, 21a', to permit of their assembly, having mating end walls, whereby they may be rigidly connected by screws 22 or otherwise secured together. The inner section 21a is preferably formed integrally with the housing 8.

Provision is made for sealingly enclosing the joint 3 and bearing 17, whereby these parts may be suitably lubricated. Referring to Figs. 1 and 2, the housing 4 is provided with an annular wall 23 between the shoulder 4a and wall 5, the inner side wall of which forms a seat for a flange 23' in which is mounted a suitable seal 24 in engagement with the shaft section 1, whereas the inner end of the shaft section 2, to which the forked members 2' are connected, is exteriorly of spherical shape, as shown at 2x for engagement with a seal ring 25 suitably fixed to the ring nut 18. In this arrangement the space or chamber within the housing 4 between the seal 24 and ring 25 is closed or sealed, whereby such space may be provided with a suitable lubricant for these parts. The housing 8 is also provided with an annular wall 26 the inner side wall of which is shaped to form a seat for a flange 26' in which is mounted a suitable seal 27 held therein by a split ring 28 in clamping engagement with the shaft section 2, the seal 27 serving to prevent the escape of lubricant for the bearing 10 from the housing 8. Referring to Figs. 4 and 5, since the housings 4 and 8 terminate in ball-and-socket members, as already set forth, and these housings are provided with seals 28 and 29, which are similar in construction to and correspondingly positioned as are the seals 24 and 27, respectively, shown in Figs. 1 and 2, they serve to seal or close the space or chamber in which the joint 3 and bearing 17 operate, which space may be provided with a suitable lubricant for these parts as well as the surfaces between the walls 20 and 21.

The form of construction shown in Figs. 1, 2 and 3 may be advantageously applied to shafting where the sections are axially related or in fixed angular relation or where one section is to be adjusted varying distances relative to the other section in one plane, whereas the form of construction shown in Figs. 4, 5 and 6, lends itself for use where one shaft section is to be adjusted in any direction relative to the other section.

To those skilled in the art to which my invention relates many changes in construction and widely differing embodiments and applications of the invention will suggest themselves without departing from the spirit and scope of the invention. My disclosures and the description herein are purely illustrative and are not to be in any sense limiting.

What I claim is:

1. The combination with related housings, of means for pivotally connecting said housings, whereby one may be disposed in angular relation to the other, a shaft comprising sections each mounted in one of said housings and terminating at their inner ends in forked members pivotally connected together on a center common to the center of the pivotal connecting means for said housings, a bearing in each housing for the adjacent shaft section spaced from the forked member thereof, and bearing devices surrounding said forked members, one device being carried by the housing for one shaft section and the other device being carried by the forked member for the other shaft section, the opposed surfaces of said bearing devices being spherically curved about the center of said forked members.

2. The combination as claimed in claim 1 wherein the pivotally connecting means between said housings consist of diametrically related trunnions on one housing and arms on the other housing engaging said trunnions.

3. The combination as claimed in claim 1 wherein the pivotally connecting means between said housings consist of ball-and-socket members carried by said housings, respectively.

4. In sectional shafting, the combination with related housings, of means for pivotally connecting said housings, whereby one may be disposed angularly to the other, a shaft comprising sections each mounted in one of said housings, a universal joint between said shaft sections consisting of pivotally connected forked members swingable about a center which is common to the axis of the pivotal connecting means between said housings, a bearing in each housing for the adjacent shaft section spaced from said driving connection, and an anti-friction bearing surrounding said joint, one race of said bearing being carried by one of said housings and the other race of the bearing being carried by the forked member related to the other housing and the opposed faces of said races being spherically curved about the center of said joint, said first mentioned bearings and said last mentioned bearing co-operating to support said shaft sections in all positions of said housings.

5. Shafting as claimed in claim 4 wherein the pivotally connecting means between said housings consist of ball-and-socket members carried by said housings, respectively.

6. A combination as claimed in claim 1 wherein said housings are provided with closure devices for sealingly enclosing said last mentioned bearing.

7. A combination as claimed in claim 1 wherein one of said housings is provided with closure devices for sealingly enclosing the first mentioned bearing therein.

EDWARD E. WALLACE.

REFERENCES CITED

The following references are of record in the file of this patent:

UNITED STATES PATENTS

| Number | Name | Date |
| --- | --- | --- |
| 1,092,746 | Robinson | Apr. 7, 1914 |
| 1,129,025 | Sneden | Feb. 16, 1915 |
| 1,186,134 | Ross | June 6, 1916 |
| 1,307,799 | Wingquist | June 24, 1919 |
| 1,447,572 | Ross | Mar. 6, 1923 |
| 1,491,988 | Holmes | Apr. 29, 1924 |
| 1,503,571 | White | Aug. 5, 1924 |
| 1,695,579 | Dusseau | Dec. 18, 1928 |
| 2,255,172 | Johnson | Sept. 9, 1941 |
| 2,331,982 | Johnson | Oct. 19, 1943 |